United States Patent Office 2,875,257
Patented Feb. 24, 1959

2,875,257

PREPARATION OF IMPROVED ALKYLATE PRODUCTS USING A SULFURIC ACID TREATMENT

Kenneth M. Thompson, Aldan, Pa., assignor to The Atlantic Refining Company, Philadelphia, Pa., a corporation of Pennsylvania No Drawing. Application June 15, 1954
Serial No. 436,976

4 Claims. (Cl. 260—674)

The present invention relates to the preparation of improved alkylated aromatic products. In a more specific aspect, the present invention relates to the purification of crude alkylated aromatic products obtained in the alkylation or aromatic compounds.

It is known that aliphatic substituted aromatic sulfonic acids and their salts have capillary active properties making them suitable for use as cleansing agents, wetting agents, dispersing agents and the like. Various processes have already been proposed for the manufacture of the alkylated aromatic compounds employed in the preparation of these sulfonic acids and acid salts. For example, alkylated aromatic hydrocarbons may be conveniently prepared by treating benzene, toluene, xylene, cumene and naphthalenes with a halogenated aliphatic hydrocarbon in the presence of a suitable alkylation catalyst of the Friedel-Crafts type, that is to say aluminum chloride, whereby there is obtained a substantial yield of monoalkyl benzene. Another method of producing alkylated aromatics comprises treating a suitable aromatic with an alcohol or a mono-olefin using a Friedel-Crafts type catalyst. A further method for producing the alkyl aromatics is to polymerize an olefin such as propylene or a gas stream containing propylene with a supported phosphoric acid catalyst at an elevated temperature and pressure, for example, 300° F. to 600° F. and 200 to 600 lbs./sq. in. pressure, thereby obtaining a mixture of propylene polymers. Benzene or other aromatic hydrocarbons are then alkylated with a propylene polymer fraction in the presence of a Friedel-Crafts catalyst such as aluminum chloride, zinc chloride, hydrogen fluoride and the like to obtain a product containing an alkyl aromatic or a mixture of alkyl aromatics.

It is common practice in the preparation of alkylated aromatics by these processes to use an excess of the aromatic material. Thus the crude alkylate product will contain substantial amounts of unreacted aromatics which must be recovered in order to purify the alkylate product and to separate the unreacted aromatic for further use in the alkylation process. It has been normal practice in the recovery of unreacted aromatics from the raw alkylate product to subject the alkylate product to a distillation, usually under vacuum, after removal by settling or other means of the catalyst phase. However, this simple distillation for the separation of unreacted aromatics is wrought with a number of difficulties. The most serious difficulty encountered in the separation of unreacted aromatics is the serious corrosion of the distillation equipment which results. This corrosion is generally due to the presence of small amounts of other impurities. These impurities include small amounts of catalyst slurry with traces of unreacted alkylating agent. In addition to causing severe corrosion of the distillation equipment, these impurities also seriously degrade the color of the resultant alkylate and the sulfonate products prepared therefrom. In order to overcome these difficulties, various methods have heretofore been proposed such as manipulative methods for carrying out the distillation and various treating processes for removing the undesirable contaminants from the alkylate products or from the resultant sulfonates. For example, U. S. Patent No. 2,441,351 describes a manipulative procedure for carrying out the distillation. However, this procedure does not eliminate the problem of corrosion or prevent discoloration of the product but merely reduces the extent of these difficulties. It has also been proposed to clay-treat the alkylate product or the sulfonic acids prepared from the alkylate product. However, this technique also fails to eliminate the problems inherent from heating the raw alkylate which contains small amounts of impurities since this procedure is generally applied after the aromatics have been removed from the alkylate.

It is therefore an object of the present invention to provide a method for purifying crude alkyl aromatic compounds. A further object of the present invention is to provide an improved method for treating crude alkylate products whereby corrosion of separation equipment is eliminated. A further object of the present invention is to provide an improved method for the purification of alkylated aromatics wherein alkylates of improved color are obtained. Another and further object of the present invention is to provide an improved process for the purification of alkylated aromatics wherein alkylated aromatics are obtained which upon sulfonation and neutralization will produce sulfonates of improved color. Other and further objects and advantages of the present invention will be obvious from the following description and examples.

In accordance with the present invention, it has been found that alkylate products of improved characteristics may be obtained and corrosion of alkylate recovery equipment may be substantially reduced by subjecting crude alkylate after the removal of catalyst slurry to a mild treatment with sulfuric acid prior to the subjection of the alkylate to distillation or other heating.

The sulfuric acid employed in the practice of the present invention may range in strength from about 78% sulfuric acid to a 99% sulfuric acid. Inasmuch as the alkylates produced in accordance with the present invention are normally sulfonated with sulfuric acid in order to prepare sulfonic acids, it is most convenient to employ sulfuric acid which has been recovered from such sulfonation reactions for use in the treatment of the sour alkylate.

The treatment of the sour alkylate in accordance with the present invention comprises contacting the sour alkylate which has been freed of Friedel-Crafts catalyst with the designated concentration of sulfuric acid at a temperature of about 60° to 160° F. for a time between about 1 minute and 30 minutes. In the preferred mode of operation, approximately 10% to 15% by volume of sulfuric acid having a concentration of 80% to 83% is contacted with a sour alkylate at a temperature of 125° to 135° F. for a period of 10 to 15 minutes.

The examples appearing below will illustrate the advantages of operating in accordance with the present invention.

EXAMPLE I

A propylene polymer produced by polymerizing a gaseous mixture containing predominantly propylene with minor amounts of propane and lower boiling hydrocarbons was prepared by contact with a supported phosphoric acid catalyst at a temperature of 500° F. at a pressure of 400 lbs./square inch. This polymer was fractionated to obtain a polymer cut having 9 to 15 carbon atoms per molecule or preferably an average of 12 carbon atoms per molecule. This fraction was then employed to alkylate benzene using aluminum chloride as a catalyst at a temperature of 150° F. The aluminum chloride catalyst was separated from the products of this reaction to obtain the material referred to herein as raw alkylate. This raw alkylate was then split into four samples. Two of these samples were untreated and the two remaining samples were treated in accordance with the present invention. The treating conditions employed on the two treated samples are listed in Table 1 below. Both the treated and untreated samples were then distilled at the temperatures indicated in Table 1 and the concentration of hydrogen chloride present after heating was then measured. This measure of the presence of hydrogen chloride in the resultant heated alkylate is an excellent measure of the degree of corrosion which will take place in distillation equipment.

*Table 1*

| Run Number | 1 | 2 | 3 | 4 |
| --- | --- | --- | --- | --- |
| Volume Raw Alkylate in cc | 1,600 | 1,600 | 900 | 900 |
| Volume Percent Sulfuric Acid | -------- | 15 | -------- | 15 |
| Acid Strength in percent | -------- | 84.2 | -------- | 82.0 |
| Contact Time in Min | -------- | 15 | -------- | 15 |
| Temperature of Contact in °F | -------- | 125 | -------- | 120 |
| Alkylate Distilled to °F | 542 | 542 | 600 | 600 |
| Held at Distillation Temp. for Min | 30 | 30 | -------- | -------- |
| Grams HCl/Gallon | 0.70 | 0.00 | 0.24 | 0.02 |

It is to be observed from the results reported in Table 1 that the two samples of alkylate which were treated in accordance with the present invention had a substantially lower content of hydrogen chloride than the untreated samples and therefore that the treated samples are far less corrosive than the untreated samples.

EXAMPLE II

Ten samples of the alkylate produced in accordance with Example I were prepared. Five of these samples were treated in accordance with the present invention while the remaining five were distilled prior to any treatment. The Saybolt color of each of the treated and untreated samples was then measured and the results of these color measurements are shown in Table 2 below:

*Table 2*

| Sample No. | Treatment | Saybolt Color |
| --- | --- | --- |
| 1 | Acid Wash | +30 |
| 2 | ----do---- | +30 |
| 3 | ----do---- | +27 |
| 4 | ----do---- | +29 |
| 5 | ----do---- | +30 |
| 6 | None | +18 |
| 7 | ----do---- | +14 |
| 8 | ----do---- | +20 |
| 9 | ----do---- | +16 |
| 10 | ----do---- | +21 |

From the results shown in Table 2, it is to be observed that the color of the treated samples ranged from 27 to 30 whereas the untreated samples had an extremely poor color ranging from 14 to 21.

EXAMPLE III

Seven samples of alkylated benzene treated in accordance with the present invention and seven untreated samples were subjected to fractionation to obtain an alkyl benzene fraction having an average of 12 carbon atoms in the alkyl group. Each of these samples was then subjected to a color test, referred to herein as an "acid wash test," in which the alkylated benzene is treated with 96% sulfuric acid for a time sufficient to convert the alkyl benzene to sulfonic acids and the resultant sulfonic acids are freed of unreacted sulfuric acid and neutralized with 49% NaOH to form the corresponding sodium sulfonates. The amount of light transmitted through a sample of the sulfonate product is then measured with a spectrophotometer employing light of 450 mu wave length. The results of these tests are reported in Table 3 as percent light transmitted as compared to a value of 100% for distilled water.

*Table 3*

| Sample Number | Treatment | Percent Light Transmitted |
| --- | --- | --- |
| 1 | Acid Contact | 96. |
| 2 | ----do---- | 92. |
| 3 | ----do---- | 93. |
| 4 | ----do---- | 93. |
| 5 | ----do---- | 93. |
| 6 | ----do---- | 94. |
| 7 | ----do---- | 94. |
| 8 | None | Black. |
| 9 | ----do---- | Do. |
| 10 | ----do---- | Do. |
| 11 | ----do---- | Do. |
| 12 | ----do---- | Do. |
| 13 | ----do---- | Do. |
| 14 | ----do---- | Do. |

The results shown in Table 3 clearly demonstrate that a much lighter sulfonate product is obtained when the alkylate from which the sulfonate is prepared is treated in accordance with the present invention. In fact the treated sulfonate products transmitted light nearly as well as pure water alone while the untreated products were black in color.

EXAMPLE IV

In order to further illustrate the superior color of sulfonates prepared from treated alkylates, a second group of fourteen alkylated benzenes were prepared as disclosed in Example III. These samples were each subjected to a second color test, referred to herein as a "sulfonate" color test. In accordance with the sulfonate color test, the alkyl benzene is treated with 20% oleum to produce the corresponding sulfonic acids, an aqueous solution of the sulfonic acids is freed of unreacted sulfuric acid, the purified sulfonic acid solution is then converted to the corresponding sodium sulfonates by treatment with 8% NaOH to form an aqueous solution containing 1% of active sulfonate. The amount of light absorbed by the 1% solution of sulfonate is then measured by subjecting the solution to light of 450 mu wave length in a spectrophotometer. The amount of light absorbed is reported in Table 4 as percent light absorbed and is compared to a value of 0% for distilled water.

*Table 4*

| Sample Number | Treatment | Percent Light Absorbed |
| --- | --- | --- |
| 1 | Acid Contact | 4 |
| 2 | ----do---- | 4 |
| 3 | ----do---- | 4 |
| 4 | ----do---- | 4 |
| 5 | ----do---- | 4 |
| 6 | ----do---- | 4 |
| 7 | ----do---- | 4 |
| 8 | None | 15 |
| 9 | ----do---- | 17 |
| 10 | ----do---- | 20 |
| 11 | ----do---- | 20 |
| 12 | ----do---- | 16 |
| 13 | ----do---- | 18 |
| 14 | ----do---- | 20 |

Table 4 clearly illustrates that the color improvements obtained by following the teachings of the present invention are far superior to untreated products as shown by a second color test.

From the results shown in the preceding examples, it is clear that by treating an alkylate product in accordance with the present invention corrosion is substantially reduced when the alkylate product is distilled or heated to remove excess aromatics and to obtain the desired alkylate cut. In addition, the examples also show that alkylate product of improved color are obtained by following the improved treating method disclosed herein.

I claim:
1. A method of removing residual amounts of catalyst and deleterious unreacted materials from crude alkyl aromatic hydrocarbon product, prepared by reacting an alkylating agent with an excess of an aromatic hydrocarbon in the presence of a Friedel-Crafts catalyst, which consists essentially of separating catalyst from said crude product, removing residual amounts of catalyst and deleterious unreacted materials prior to distillation by contacting the separated product for a period of 1 to 30 minutes and at a temperature of 60° F. to 160° F. with sulfuric acid of 78 percent to 99 percent concentration, the combination of said contacting periods and said acid concentrations being such as to prevent appreciable sulfonation of said alkyl aromatic hydrocarbon, and separating the sulfuric acid phase from the hydrocarbon phase.

2. A method of removing residual amounts of catalyst and deleterious unreacted materials from crude alkyl aromatic hydrocarbon product, prepared by reacting an alkylating agent with an excess of an aromatic hydrocarbon in the presence of a Friedel-Crafts catalyst, which consists essentially of separating catalyst from said crude product, removing residual amounts of catalyst and deleterious unreacted materials prior to distillation by contacting the separated product for a period of 10 to 15 minutes and at a temperature of 125° F. to 135° F. with 10 percent to 15 percent by volume of sulfuric acid of 80 percent to 83 percent concentration, and separating the sulfuric acid phase from the hydrocarbon phase.

3. A method of removing residual amounts of catalyst and deleterious unreacted materials from crude alkyl benzene hydrocarbon product, prepared by reacting an alkylating agent with an excess of benzene in the presence of a Friedel-Crafts catalyst, which consists essentially of separating catalyst from said crude product, removing residual amounts of catalyst and deleterious unreacted materials prior to distillation by contacting the separated product for a period of 1 to 30 minutes and at a temperature of 60° F. to 160° F. with sulfuric acid of 78 percent to 99 percent concentration, the combination of said contacting periods and said acid concentrations being such as to prevent appreciable sulfonation of said alkyl benzene hydrocarbon, and separating the sulfuric acid phase from the hydrocarbon phase.

4. A method of removing residual amounts of catalyst and deleterious unreacted materials from crude alkyl benzene hydrocarbon product, prepared by reacting an alkylating agent with an excess of benzene in the presence of an aluminum chloride catalyst, which consists essentially of separating catalyst from said crude product, removing residual amounts of catalyst and deleterious unreacted materials prior to distillation by contacting the separated product for a period of 10 to 15 minutes and at a temperature of 125° F. to 135° F. with 10 percent to 15 percent by volume of sulfuric acid of 80 percent to 83 percent concentration, and separating the sulfuric acid phase from the hydrocarbon phase.

References Cited in the file of this patent
UNITED STATES PATENTS

| Number | Name | Date |
|---|---|---|
| 2,258,236 | Benedict et al. | Oct. 7, 1941 |
| 2,364,782 | Flett | Dec. 12, 1944 |
| 2,396,144 | Anderson et al. | Mar. 5, 1946 |
| 2,471,054 | Amick | May 24, 1949 |
| 2,667,519 | Paltz et al. | Jan. 26, 1954 |
| 2,682,498 | Shmidl | June 29, 1954 |
| 2,688,633 | Cohen | Sept. 7, 1954 |
| 2,703,330 | Bloch et al. | Mar. 1, 1955 |
| 2,806,875 | Geiser | Sept. 17, 1957 |
| 2,813,917 | Sharrah | Nov. 19, 1957 |